US012103141B2

(12) United States Patent
Buchanan

(10) Patent No.: US 12,103,141 B2
(45) Date of Patent: Oct. 1, 2024

(54) LINE WRENCH HEADS AND LINE WRENCHES

(71) Applicant: Bobby Hu, Taichung (TW)

(72) Inventor: Nigel Buchanan, New Gilston (GB)

(73) Assignee: Bobby Hu, Taichung (TW)

( * ) Notice: Subject to any disclaimer, the term of this patent is extended or adjusted under 35 U.S.C. 154(b) by 578 days.

(21) Appl. No.: 16/494,712

(22) PCT Filed: Mar. 16, 2018

(86) PCT No.: PCT/GB2018/050702

§ 371 (c)(1),
(2) Date: Jan. 27, 2021

(87) PCT Pub. No.: WO2018/167520

PCT Pub. Date: Sep. 20, 2018

(65) Prior Publication Data

US 2021/0122012 A1 Apr. 29, 2021

(30) Foreign Application Priority Data

Mar. 16, 2017 (GB) ..................................... 1704196
May 8, 2017 (GB) ..................................... 1707287

(51) Int. Cl.
*B25B 13/50* (2006.01)
*B25B 13/48* (2006.01)
*B25B 23/00* (2006.01)

(52) U.S. Cl.
CPC ............ *B25B 13/50* (2013.01); *B25B 13/481* (2013.01); *B25B 23/0007* (2013.01)

(58) Field of Classification Search
CPC ..... B25B 13/461; B25B 13/462; B25B 13/48; B25B 13/481; B25B 13/08; B25B 13/28; B25B 13/50; B25B 13/463; B25B 13/505; B25B 23/0007
See application file for complete search history.

(56) References Cited

U.S. PATENT DOCUMENTS

| | | | | |
|---|---|---|---|---|
| 7,188,551 B2 * | 3/2007 | Choi | ........................ | B25B 13/46 81/98 |
| 7,418,890 B2 * | 9/2008 | Buchanan | ............... | B25B 13/56 81/64 |
| 8,733,214 B2 * | 5/2014 | Hsu | ......................... | B25B 13/18 81/126 |

(Continued)

FOREIGN PATENT DOCUMENTS

CN 2360221 Y 1/2000

*Primary Examiner* — David B. Thomas
(74) *Attorney, Agent, or Firm* — Thibault Patent Group

(57) ABSTRACT

The wrench has a thumb switch, when operated, opens against a spring bias the pivotal ring portion around the axis pin attached to the fixed head portion of the wrench head portion, allowing a tube or pipe attached to the fastener to access the confines of the wrench head hexagonal inner profile via the said access channel now provided, the opening of the pivotal ring portion involves approximately 50% of the wrench head portion, the said pivotal ring portion encompassing approximately 50% of the wrench head inner profile. The corner profiles next to the swivel joints are scalloped such that when the pivotal ring is opened the scallops substantially align forming a passageway required for the abutting fastener drive corner to traverse through.

14 Claims, 11 Drawing Sheets

(56) References Cited

U.S. PATENT DOCUMENTS

| | | | | |
|---|---|---|---|---|
| 8,806,988 | B2 * | 8/2014 | Chang | B25B 13/12<br>81/126 |
| 8,925,425 | B2 * | 1/2015 | Merhar | B25B 13/52<br>81/111 |
| 9,056,389 | B2 * | 6/2015 | Buchanan | B25B 13/481 |
| 9,827,652 | B2 * | 11/2017 | Mills | B25B 13/32 |
| 9,884,409 | B2 * | 2/2018 | Yang | B25B 13/505 |
| 10,543,585 | B2 * | 1/2020 | Hirse | B25B 13/46 |
| 2009/0044666 | A1 * | 2/2009 | Xinhong | B25B 13/46<br>81/92 |
| 2010/0122610 | A1 * | 5/2010 | Chen | B25B 13/04<br>81/111 |
| 2013/0055859 | A1 * | 3/2013 | Wu | B25B 13/46<br>81/97 |
| 2017/0165814 | A1 * | 6/2017 | Chern | B25B 13/12 |
| 2017/0203417 | A1 * | 7/2017 | Yang | B25B 13/28 |
| 2018/0193984 | A1 * | 7/2018 | Hirse | B25B 13/46 |

* cited by examiner

LINE WRENCH HEADS AND LINE WRENCHES

FIELD OF THE INVENTION

The present invention relates to line wrench heads and line wrenches.

Pipes or tubes may be connected to various hydraulic or pneumatic apparatus or controls by means of flare, pipe or tube nuts. Tube nuts are generally made from brass or other relatively soft metals that can be easily damaged during tightening and loosening operations, especially when corrosion or the like causes the tube nut to be tighter than expected. When used on tight fasteners normal open-ended wrenches tend to round off the corners of the flats, often to a stage that they become inoperable. Line wrenches are preferred for work with flare nuts as they provide greater engagement with the fastener surfaces, reducing the likelihood of slippage.

BACKGROUND TO THE INVENTION

U.S. Pat. No. 7,073,413 discloses a wrench comprising a fold out flexible ring portion having an inner fastener engaging surface. The flexible ring portion is designed to grip a fastener such that the greater the torque that is applied to the handle, the greater is the grip applied by the flexible ring portion to the fastener. This wrench normally has to be removed from the fastener and then re-attached every time the wrench reaches the limit of its operational travel. In other words, the wrench does not have a ratcheting capability.

U.S. Pat. No. 6,978,701 discloses a wrench in which an opening part of a ring head is connected with a fixed part of the ring head by a link in similar fashion to the links of a bicycle chain. The free end of the opening part increases progressively in width towards its tip. In a commercial version of the line wrench, a compression spring is utilised between fixed and opening parts. The two parts have respective elongate extension portions provided with respective bores to receive the compression spring. The extension portions are disposed at the top of the wrench head generally opposite the wrench handle so that the spring can impart an effective closing action upon the opening part. This effectively increases the height of the wrench head measured from the handle. The opening part opens in a cantilever-like fashion. The wrench is capable of "ratcheting" 60 degrees from one fastener flat to the next when operated in the reverse direction. Although commercially very successful, these wrenches cannot be utilised in all situations. The additional height resulting from the extension portions containing the compression spring may restrict the use of the wrench when the gap between the fastener and any adjacent equipment is relatively small. Also, as the bores for the compression spring are inherently shallow, the compression spring is near or at its solid compression point, which has led to kinking, bulging and premature failure. Another disadvantage of this line wrench is that opening of the wrench head normally requires the use of two hands.

U.S. Pat. No. 4,967,612 discloses a wrench head that combines the structure of known open and socket wrenches. This wrench has an inherent problem in that it has to lock onto a fastener before any useful work can be done. In particular, the proportion of the supplied torque required to maintain a grip upon the workpiece or fastener is relatively high and if there is insufficient torque applied, there is likely to be slippage between the fastener and the wrench head.

It is an object of the invention to at least partially alleviate the above-mentioned disadvantages, or to provide an alternative to existing products.

SUMMARY OF THE INVENTION

The invention provides a line wrench head comprising:

a fixed head portion comprising a first inner side comprising a plurality of fastener engaging surfaces;

a pivoting head portion comprising a second inner side comprising at least one fastener engaging surface;

a pivot member by which said pivoting head portion is pivotally connected to said fixed head portion, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space;

an elongate anti-kinking member; and a biasing member that biases said pivoting head portion to said closed position, wherein said pivoting head portion comprises a bore in which said pivot member is received and a lever arm extending away from said bore and is disposed alongside said fixed head portion such that movement of said lever arm towards said fixed head portion causes said pivoting head portion to move from said closed condition to said open condition, wherein said biasing member is a compression spring and said elongate anti-kinking member is disposed within said compression spring to at least reduce kinking of said compression spring, said elongate anti-kinking member having a first end, a second end disposed opposite said first end and respective taper portions that narrow towards said first and second ends, wherein said free end of said pivoting head portion has a tip and has a width that narrows towards said tip to define an outwardly facing ramp face, and wherein said first inner side comprises a camming surface engaged by said ramp face when the pivoting head portion is in said closed position and configured such that, in use, torque applied to said fixed head causes increased engagement between said ramp face and said camming surface to provide an increased grip on a fastener received in said fastener receiving space.

The invention also includes a line wrench head comprising:

a fixed head portion comprising a first inner side comprising a plurality of fastener engaging surfaces;

a pivoting head portion comprising a second inner side comprising at least one fastener engaging surface;

a pivot member by which said pivoting head portion is pivotally connected to said fixed head portion;

a hollow biasing member; and an elongate anti-kinking member disposed within in said hollow biasing member, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space, wherein said pivoting head portion has a free end that defines an outwardly facing ramp face and said first inner side comprises a camming surface engaged by said ramp face when the pivoting head portion is in said closed position and configured such that, in use, torque applied to said fixed head causes increased engagement between said ramp face and said camming surface to provide an increased grip on a fastener received in said fastener receiving space, wherein said biasing member biases said pivoting head portion to said closed position, and wherein said anti-kinking member has a first end, a second end disposed opposite said first end and respective taper portions that narrow towards said first and second ends.

The invention also includes a line wrench head comprising:

a fixed head portion comprising a first inner side comprising a plurality of fastener engaging surfaces;

a pivoting head portion comprising a second inner side comprising at least one fastener engaging surface;

a biasing member having a first end and a second end;

an elongate anti-kinking member having a first end and a second end; and a pivot member by which said pivoting head portion is pivotally connected to said fixed head portion, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space, said biasing member providing a biasing force that biases said pivoting head portion to said closed condition, wherein said pivoting head portion has a free end that defines an outwardly facing ramp face and said first inner side comprises a camming surface engaged by said ramp face when the pivoting head portion is in said closed position, said ramp face and said camming surface configured such that, in use, torque applied to said fixed head causes increased engagement between said ramp face and said camming surface so that said free end of said pivoting head portion pressed inwardly with respect to said fastener receiving space and against a fastener received in said fastener receiving space to provide increased grip on said fastener, wherein said pivoting head portion comprises a bore in which said pivot member is received and a lever arm extending away from said bore and disposed alongside said fixed head portion such that movement of said lever arm towards said fixed head portion causes said pivoting head portion to move from said closed condition to said open condition, wherein said elongate anti-kinking member is disposed within said biasing member, and wherein said fixed head portion and lever arm comprises a first recess in which said first ends of said biasing member and said elongate anti-king member are received and a second recess in which said second ends of said biasing member and elongate anti-kinking member are received.

The invention may provide a low-cost ratcheting line wrench and in particular a line wrench with a low-profile wrench head that is capable of resiliently biasing closed the pivoting head portion of the wrench head in order to provide a fastener "flat to flat" or alternately a point to point ratcheting function. The invention may provide an uncomplicated tool that can be easily opened using one hand, whilst being simple, robust and inexpensive to manufacture.

The invention may provide a low-profile wrench head with a biasing spring and a protective location for the spring. The wrench may comprise a wrench head adapted to engage and apply torque to a workpiece such as a flare nut attached to a tube or pipe and turning means for turning said wrench head, said wrench head including a pivoting head portion attached to a fixed head portion at one end and free at its other end, said pivoting head portion having fastener engagement faces for engaging a flare nut, hydro-vac, plain fastener or any nut type pipe connector fitting drive surfaces (hereinafter termed a fastener), the said fixed head portion including a closing portion for interaction with a profile on the free end of the pivoting head portion in order to effect, in use, a locking and clamping action when a drive torque is applied, wherein at or adjacent the closing portion the free end of the pivoting head portion is in the form of a decreasing ramp or wedge, such that when an increasing torque is applied to the wrench head, a face of the closing portion is driven up the said ramp, causing the said pivoting head portion to close around the flare nut drive surfaces increasing the grip on the fastener as more torque is applied to the wrench head.

In order to affect a ratchet like action between the wrench head and the operated fastener, the pivoting head portion is resiliently biased to a closed condition by a spring located within opposing bores within the fixed head and the pivoting head portion and can be pivoted away from the fixed head portion against the spring bias. This sprung hinge like mechanism allows the said pivoting head portion to swivel open, to not only allow the said wrench head inner sides to usefully access the confines of the flare nut attached pipework, but allow the pivoting head portion to usefully open enough against the said resilient bias to allow the turning means to be repositioned in the reverse direction onto the next fastener drive face or drive corner ready for the next drive sequence. The said pivoting head portion can be further usefully swivelled open against the force of the spring, by a convenient thumb switch, or lever that is integral with the pivoting head portion, for the purpose of accessing or withdrawal from the circumference of the said attached pipework.

The opening of the pivoting head portion may involve pivoting of 50% of the fastener engaging surfaces defined by the wrench head, as the pivoting head portion may encompass approximately 50% of a fastener receiving space defined by the wrench head.

The said inner profile of the wrench head at the curved interior corner profile nearest to the swivel joint portions has further scallops. These scallops generally fully align when the pivotal ring portion is fully open relative to the fixed head portion, in particular when the wrench head portion requires to be repositioned or reversed, relative to the operated fastener within the wrench head inner profile, the fastener corners requiring a passageway generally equivalent to the circumference diameter of the fastener corner points as the fastener corners rotate within the confines of the wrench head inner profile, the said fastener corners opening as required the pivoting head portion against the spring during the reverse action and in particular the fastener corner adjacent the swivel joint portions incorporating the said scallops usefully allows the said fastener corner to arc into the said scalloped recesses produced as the turning means is operated in the reverse direction, the pivotal ring portion thereby opening sufficiently to allow the passage of the abutting fastener corner being repositioned.

The pivoting head portion swivel joint may be orientated such that the outer joint laminations are incorporated within the fixed head portion and the inner swivel joint lamination is incorporated within the pivoting head portion, this provides in use the best contact area between the operated fastener and the fastener engagement faces, when the wrench head is closed and the turning means operated in the drive direction as the profile of the said outer laminations still incorporate sufficient fastener engagement faces to allow the fastener to be robustly operated, the inner said lamination profile next to its swivel joint in this iteration having little or no engagement face acting upon the operated fastener. The said outer laminates scalloped profile being situated at a point directly adjoining the fastener engagement faces next to the swivel joint.

The opening of the pivoting head portion may usefully and conveniently be accomplished by the use of only one hand by the incorporation at the end opposite that of the free end of the pivoting head portion, of a thumb switch incorporated within the outer levering end of the said pivoting head portion.

The spring may take the form of a compression spring force acting upon both the said fixed and pivoting head portions of the said wrench head in order to resiliently bias the said pivoting head portion inwards towards the said fixed head portion, although, other types of spring could be used. The majority of the spring length can now be usefully retained within the elongate spring bore within the fixed head portion, the said elongate spring bore diameter can further be substantially larger than the said corresponding spring diameter which can usefully result in the spring operation being usefully far less than its solid height and also less liable to kinking during its operation.

The biasing spring may be held against kinking by a non-kink device that may comprise a pliable piece of plastics rod with rounded ends disposed within its confines. The length of the said non-kink device may be just less than that of the compressed length of the compression spring around its circumference, when the said spring is compressed in the pivoting head portion opening sequence, the further use of torpedo shaped rounded ends preventing the coils of the compression spring being caught on the said anti-kink device ends as the said spring and anti-kink device are resiliently bowed during the said spring compression throughout the pivoting head portion opening sequence. The use of the said anti-kink device, usefully prevents the destructive bulging action prevalent in this type of bowed compression spring usage.

The pivoting head portion may have a corrugated outer surface, the said corrugations situated opposite the curved interior corner profiles in order to incorporate as low a profile wrench head as is prudent.

The fixed head portion and pivoting head portion may be made from known spring steel in order that they may resiliently flex without detriment.

The wrench head may have a 12-point castellated fastener drive arranged to form a stress relieved structure by inward and outward curves on the outer circumference of the wrench head. The inner profile U shaped interior corner profiles, corresponding to the curved outermost profiles, the resultant corrugations allow the pivoting head portion to resiliently flex at the corners of the said fastener engagement faces when torque is applied in the drive direction to the turning means, further usefully reducing the cross-sectional area of the inner hexagonal shape of the said wrench head inner profile, further usefully increasing the said working surface profiles grip upon the operated fastener drive corners. The repositioning or reverse sequence in this iteration only requiring a 30 degrees movement instead of the prior 60 degrees.

A Marshalling of Reference Numerals Utilised in the Drawing

| | |
|---|---|
| 1/Low Profile Line Wrench | |
| 200/Wrench Head | |
| 201/Fastener Engagement Faces | |
| 202/Fixed Head Portion | |
| 203/Fixed Head Axis Pin Bore | 40/Turning Means |
| 204/Wrench Head Inner Profile | 41/Turning Means Hand Grip |
| 205/Hexagonal Internal Profile | 42/Turning Means Square Drive |
| 206/12 Point Castellated Fastener Drive | |
| 207/U Shaped Interior Corner Profiles | |
| 208/Swivel Joint Portion | |
| 209/Swivel Joint Slot | |
| 210/Fixed Cam Face | 50/Axle Pin |
| 211/Access Channel | |
| 212/Curved Internal Corner Profiles | |
| 213/Fixed Head Portion Scallop | |
| 214/Outer Swivel Joint Lamination | 60/Resilient Portion |
| 215/Elongate Spring Bore | 61/Resilient Portion Anti-Kink Device |
| | 62/Anti-Kink Device Sloped Ends |
| 300/Pivoting Head Portion | |
| 301/Fastener Engagement Faces | |
| 302/Flexible Ring Portion | 70/Fastener |
| 303/Pin Bore | 71/Fastener Drive Faces |
| 304/Spring Bore | 72/Fastener Drive Corners |
| 305/Free End | 73/Fastener Drive Corner Diameter |
| 306/End Cam Surface | 74/Fastener Elongate Attachment |
| 307/Thumb Switch | |
| 308/Swivel Joint Portion | |
| 309/Corrugated Outer Surface | |
| 310/Curved Interior Corner Profiles | |
| 311/12 Point Drive Outer Corrugations | 80/Workpiece |
| 312/12 Point Castellated Fastener Drive | 81/Workpiece Close Obstruction |
| 313/U Shaped Interior Corner Profiles | |
| 314/Inner Swivel Joint Lamination | |
| 315/Pivotal Ring Scallop | D/Drive Direction |
| 316/Pivotal Ring Levering End | R/Reverse Direction |
| 317/Swivel Joint Portion Reduced Profile | W/Wrench Head Wall Width |

BRIEF DESCRIPTION OF THE DRAWINGS

Embodiments of the invention, given by way of example, will now be described with reference to the drawings, in which.

DETAILED DESCRIPTION

Figure 1:
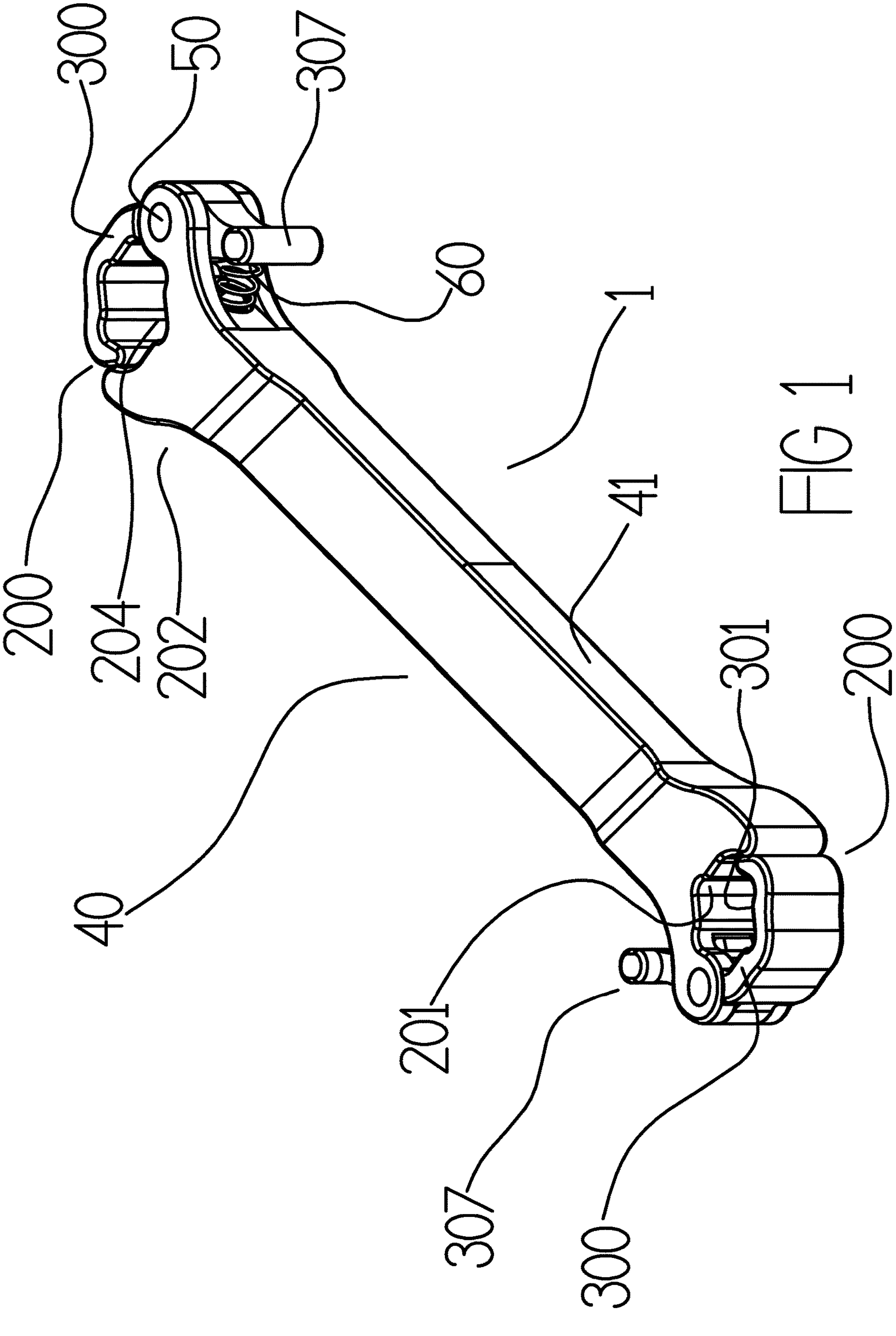
FIG. 1 is a perspective view of a line wrench in accordance with the invention.

As required, detailed embodiments of the invention are disclosed herein. However, it is to be understood that the disclosed embodiments are merely examples of the invention that may be embodied in various forms. The drawings are not necessarily to scale, as some features may be exaggerated to show details of particular components. Therefore, specific structural and functional details disclosed herein are not to be interpreted as limiting, but merely as a basis for the claims and as one skilled in the art to variously employ the invention.

The embodiments described herewith will be described with reference to FIGS. 1 to 14, in accordance with the invention there is provided a line wrench 1 having a wrench head 200 adapted to engage and apply torque to a fastener 70 such as a flare nut attached to tube or pipe 74 and turning means 40 for turning the wrench head 200, the wrench head 200 including a pivoting head portion 300, attached to a fixed head portion 202 at one end and free at its other end, the pivoting head portion 300 having fastener engagement faces 301 for engaging the operated flare nut, hydro-vac, plain fastener or any nut type pipe connector fitting 70 (hereinafter termed a said fastener 70) drive surfaces 71. The fixed head portion 202 including a fixed cam face 210 for interaction with an end cam surface 306 on the free end 305 of the pivoting head portion 300 in order to effect in use a locking and clamping action when the turning means 40 is operated in the appropriate drive direction D, wherein the said pivotal ring portion 300 free end 305 outer surface at or adjacent the fixed cam face 210 is in the form of a decreasing ramp or wedge (hereinafter termed an end cam surface 306), such that as when increasing torque is applied to the turning means 40 the fixed cam face 210 is driven up the end cam surface ramp 306 on the pivoting head portion free end 305, causing the pivoting head portion 300 to close around the fastener drive surfaces 71 increasing the grip imparted between the wrench head inner profile 204 and the fastener drive faces 71, the more torque is applied to the turning means 40. In order to affect a ratchet like action between the head portion 200 and the operated fastener 70, the pivoting head portion 300 is resiliently biased into the closed position by a resilient portion 60, located within apposing bores 215, 304 within the fixed head portion 202 and the pivoting head portion 300. This sprung hinge like mechanism allows the pivoting head portion 300 to swivel open to not only allow the wrench head inner profile 204 to usefully access the circumference of the flare nut attached pipework 74 via the produced access channel 211, but allow the said pivoting head portion 300 to usefully open enough against the resilient bias 60 to allow the turning means 40 to be repositioned in the reverse direction R onto the next fastener drive face 71 or drive corner 72 ready for the next drive D sequence. The pivoting head portion 300 can be further usefully swivelled open against the force of the resilient portion 60, by a convenient said thumb switch 307 incorporated within the pivoting head portion 300, for the purpose of accessing or withdrawal from the circumference of the said attached said elongate attachment 74.

Figure 2:
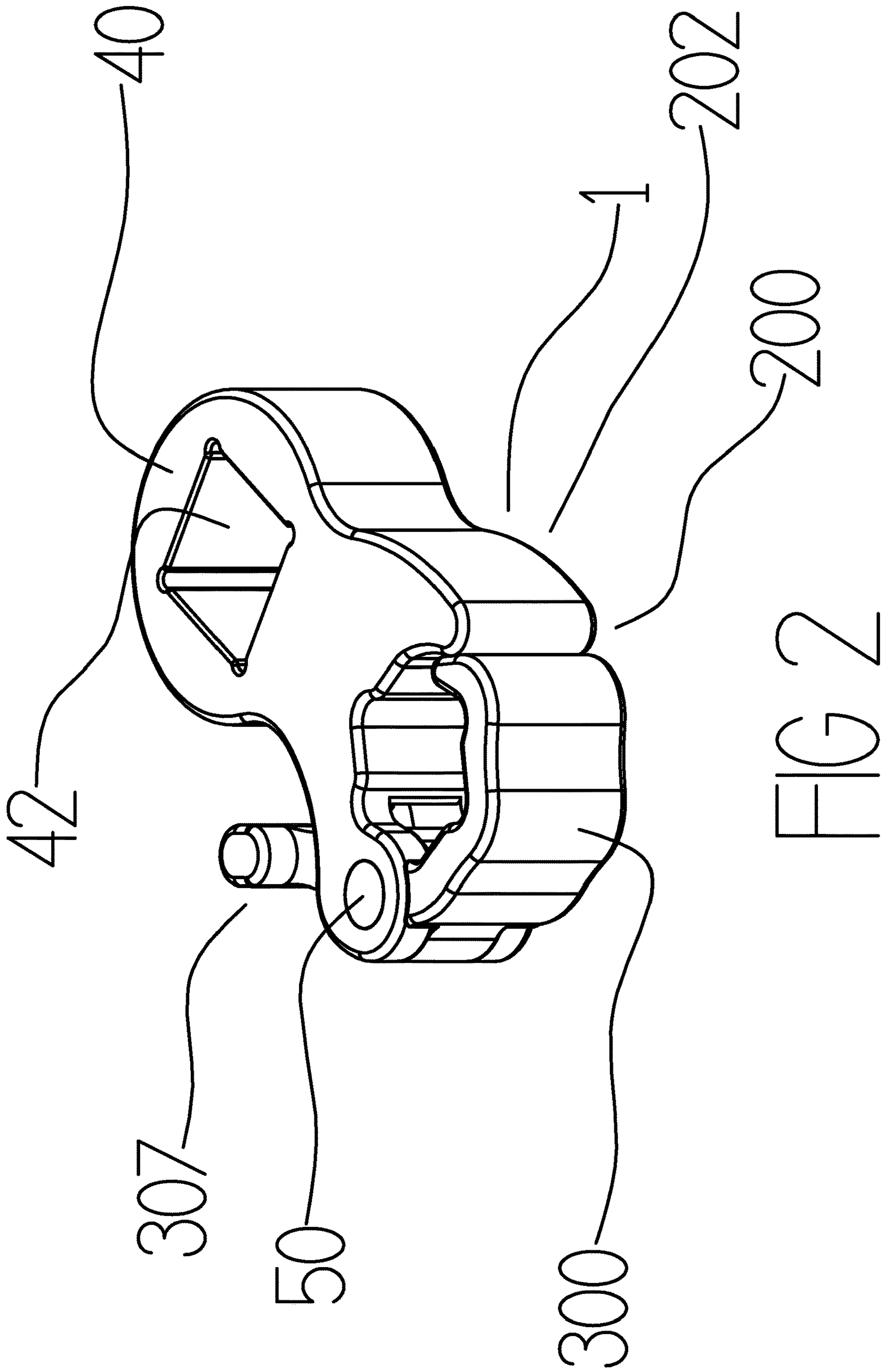
FIG. 2 is a perspective view of a line wrench head in accordance with the invention.
Figure 3:
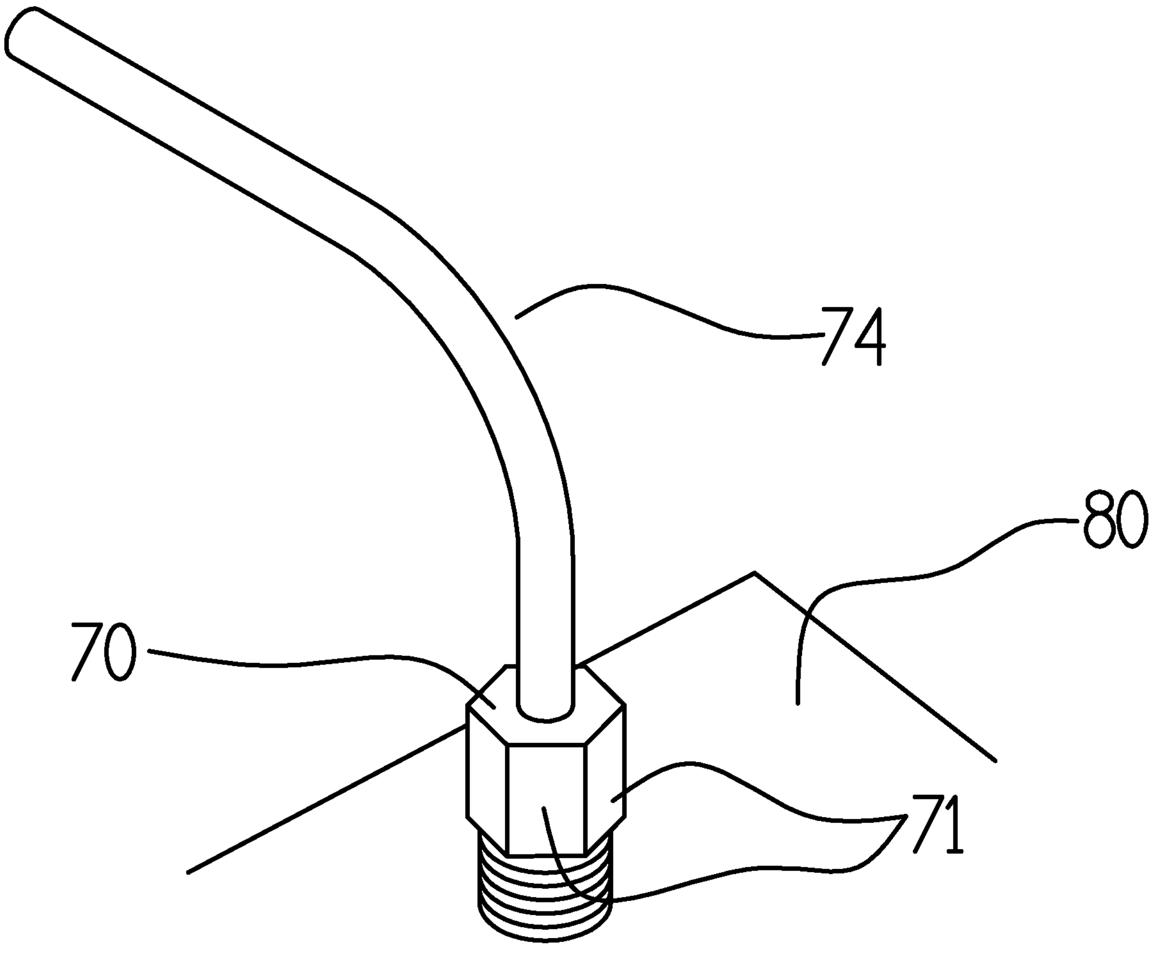
FIG. 3 is a perspective view of a typical flare-nut or fastener

FIGS. 1, 2 and 3 denote the line wrench 1 having a wrench head 200 able to engage and apply torque to a fastener 70 and turning means 40 for turning the wrench head portion 200, the turning means 40 can be for example in the shape of a hand grip 41 or socket square drive 42, the said head portion 200 including a pivoting head portion 300 attached to the fixed head portion 202 by an axis pin 50, a wrench head inner profile 204 having fastener engagement faces 201, 301 for engaging the fastener 70 drive faces 71. Further illustrated is the said fastener elongate attachment 74 and its appended workpiece 80. The means of operating the pivoting head portion 300, the thumb switch 307, with its resilient bias portion 60 are further shown.

In the first embodiment of the present invention the opening of the pivoting head portion 300 involves approximately 50% of the wrench head portion 200, the said pivoting head portion 300 encompassing approximately 50% of the wrench head inner profile 204.

Figure 4:
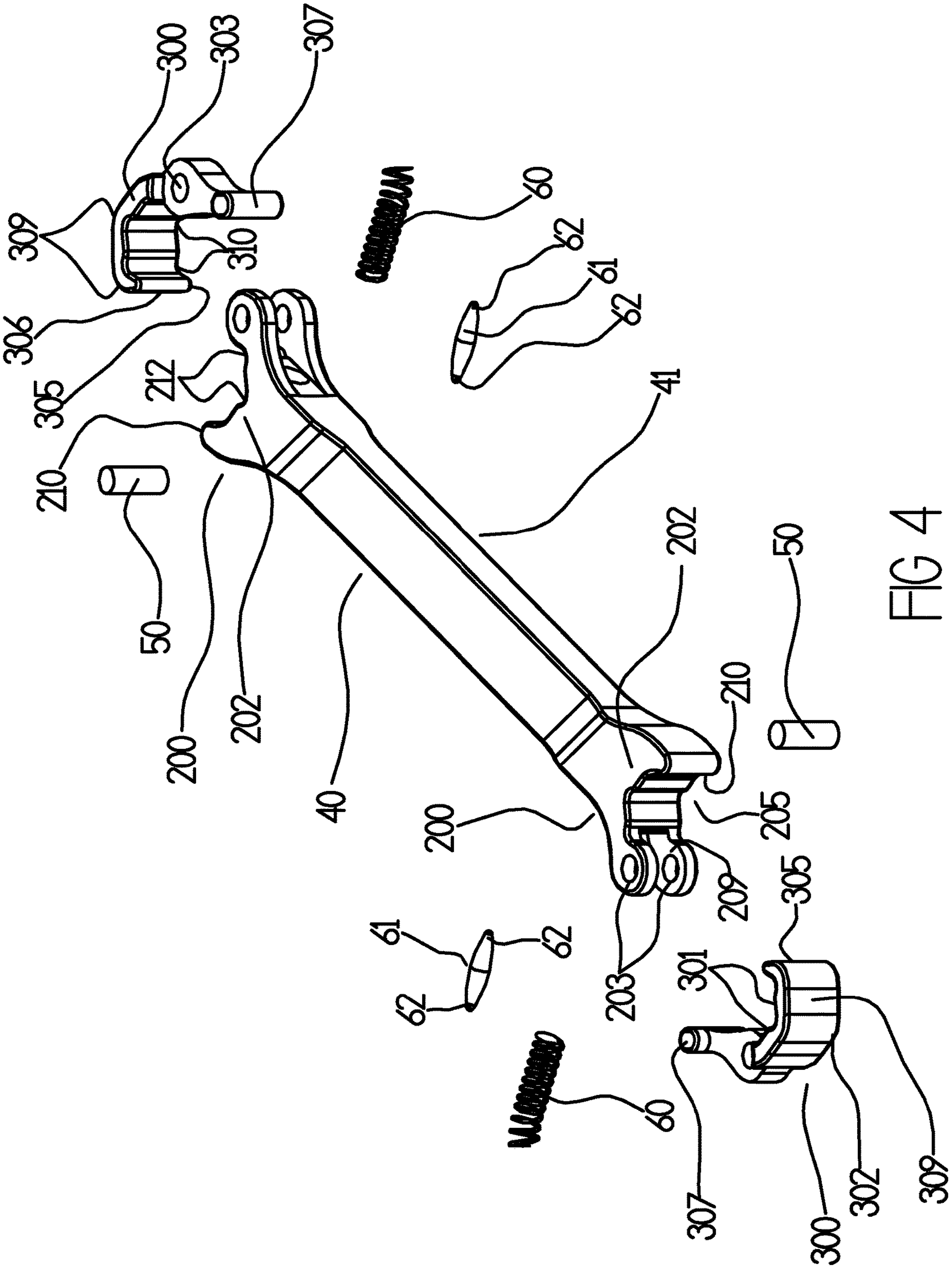
FIG. 4 is an exploded perspective view of the line wrench of FIG. 1.

FIG. 4 shows the said line wrench 1 dismantled for demonstration purposes, illustrating the wrench head 200, fixed head portion 202, fixed head axis pin bores 203, hexagonal internal profile 205, swivel joint portion 208, swivel joint slot 209, fixed cam face 210, curved interior corner profiles 212, pivoting head portion 300, fastener engagement faces 301, flexible ring portion 302, pin bore 303, free end 305, end cam surface 306, thumb switch 307, swivel joint portion 308, corrugated outer surface 309, curved interior corner profiles 310, turning means 40, hand grip 41, axis pin 50, resilient portion 60, resilient portion anti-kink device 61 with sloped ends 62.

Figure 5:
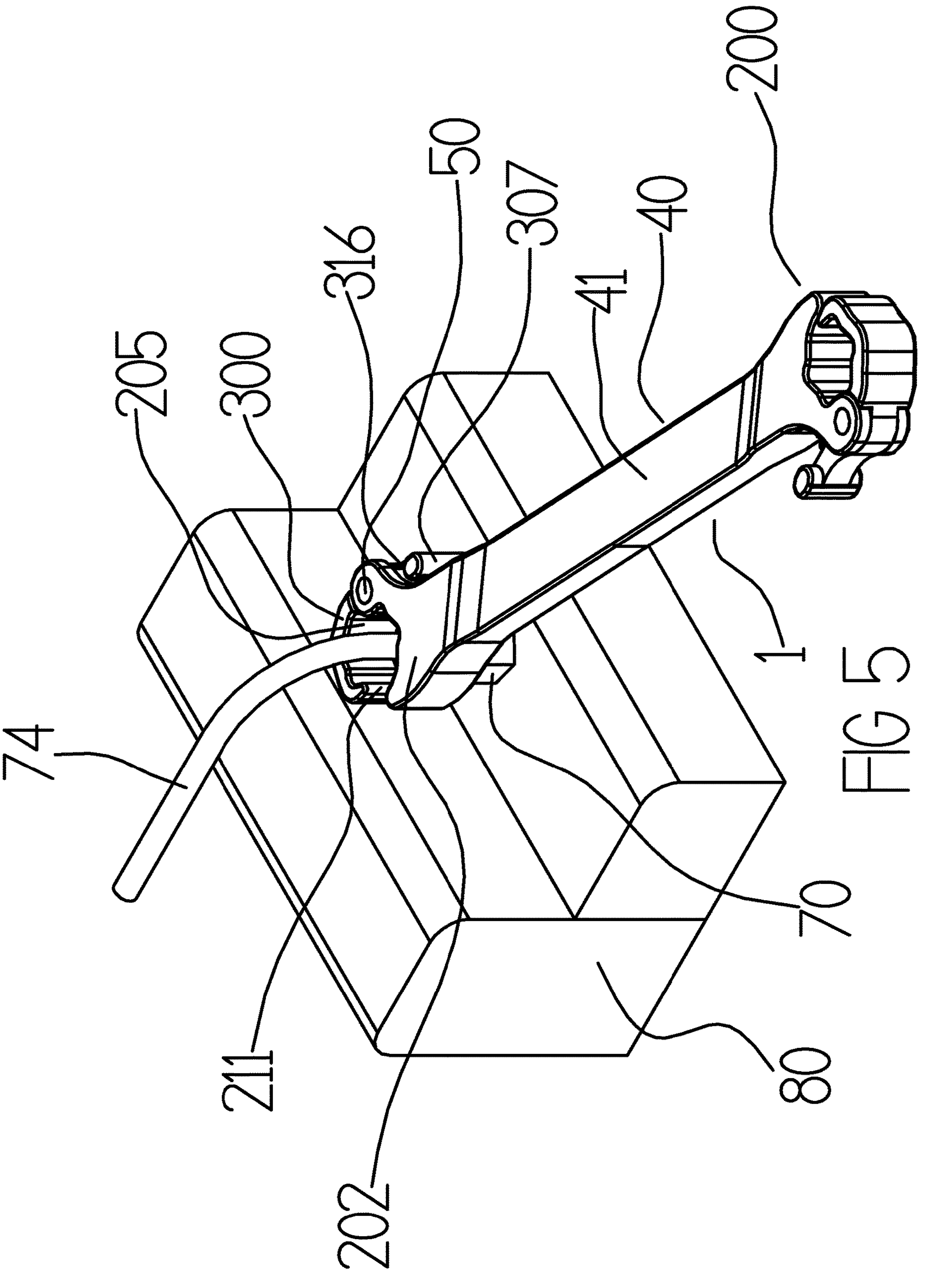
FIG. 5 is a perspective view of the line wrench with the wrench head in the open position a pipe is shown travelling into the formed aperture.

FIG. 5 illustrates a further embodiment of the said line wrench 1 with a thumb switch 307 being integral within the pivoting head portion 300 levering end 316, the thumb switch 307 shown operated, the opening the pivoting head portion 300 pivoted around the axis pin 50 attached to the fixed head portion 202 of the wrench head portion 200, allowing the tube or pipe 74 attached to the fastener 70 to access the confines of the said hexagonal inner profile 205 via the said access channel 211 now provided. The said fastener 70 is suitably attached by known means to the said workpiece 80. The said hand grip 41 of the illustrated turning means 40 further shown.

Figure 6:
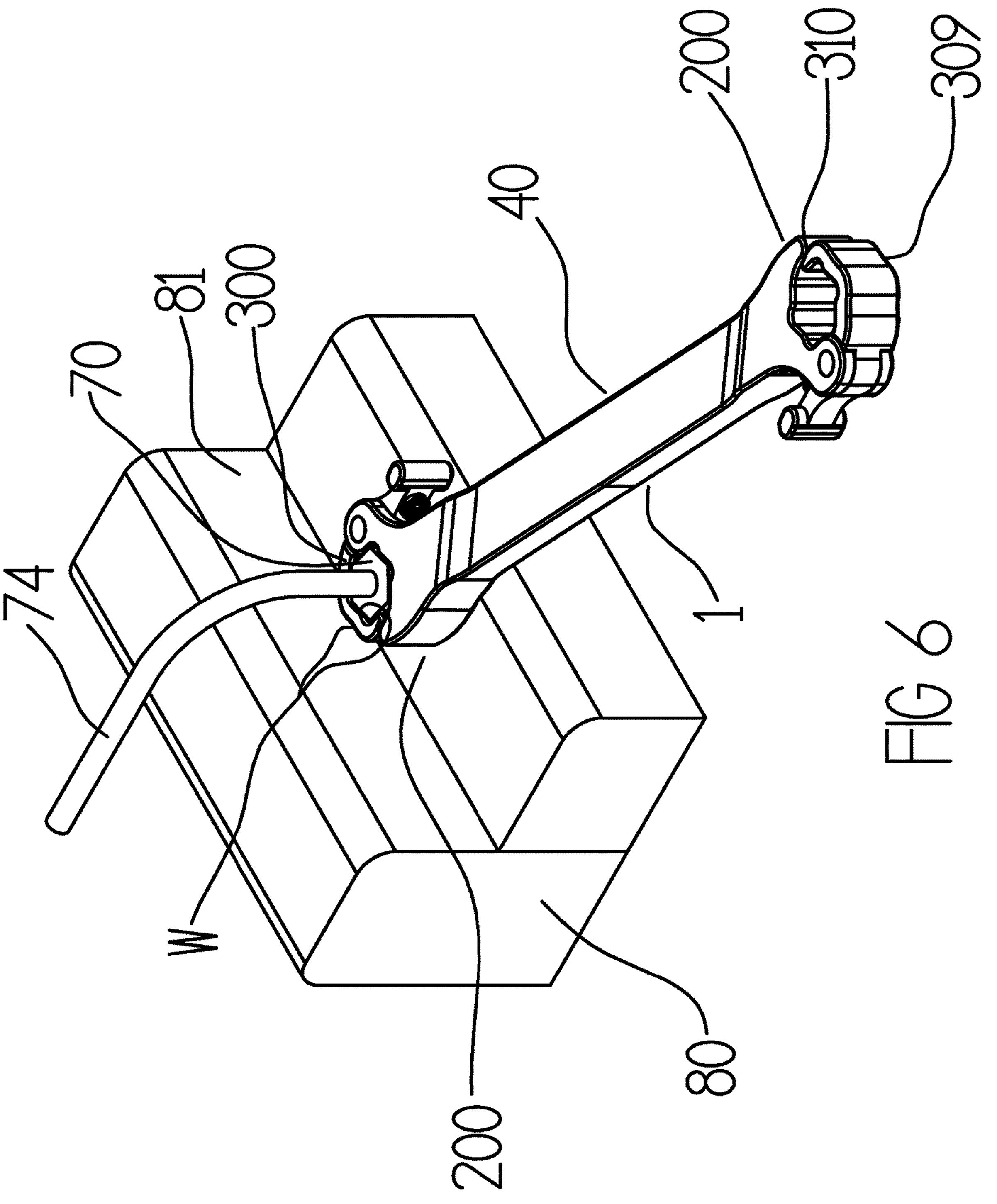
FIG. 6 is a perspective view of the line wrench with the line wrench head engaged upon a tube nut which is in close proximity to an obstruction.
Figure 8:
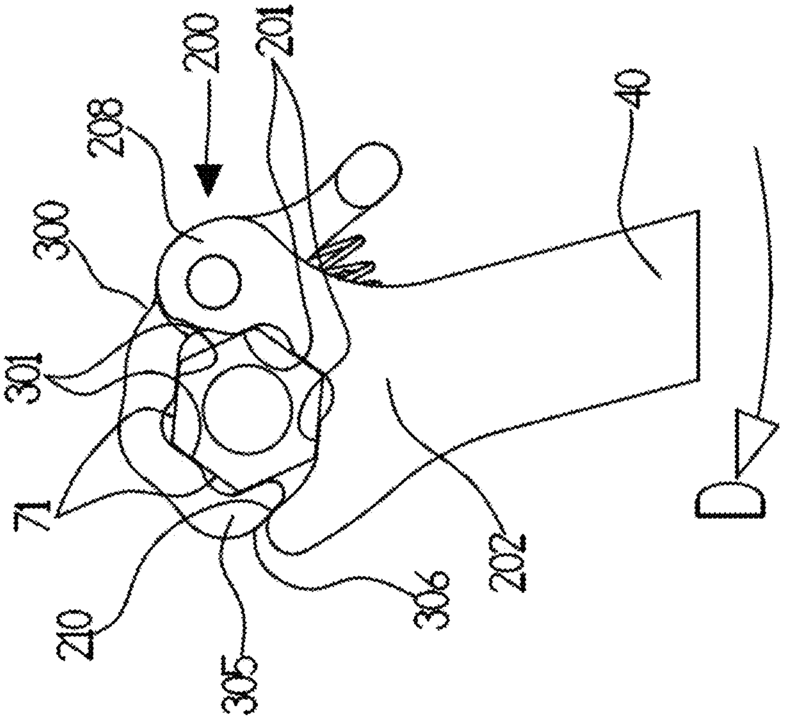
FIG. 8 is a plan view of the line wrench head operated in the drive direction upon a correspondingly sized fastener, the opening portion end cam surface shown abutting against the fixed head portion cam face and all the wrench head fastener drive faces operating against the all the fastener drive faces.
Figure 7:
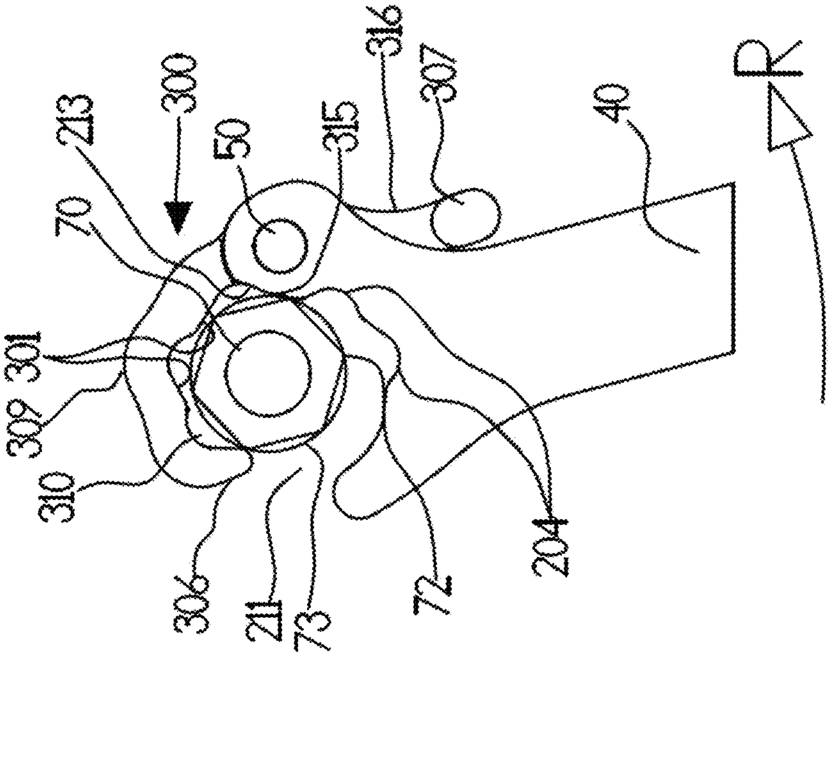
FIG. 7 is a plan view of the line wrench head operated in the reverse direction upon a correspondingly sized fastener, the opening portion shown swivelling open against the resilient portion allowing the wrench to be repositioned upon the incumbent fastener. The fastener drive corners highlighted by a circle showing their diameter and the requirement of the scallops.

FIGS. 6, 7 and 8 shows a further embodiment of the line wrench 1 whereas the said pivoting head portion 300 is of a low profile, enabling the said wrench 1 to be utilised in circumstances where the said fastener 70 to be operated is adjacent to a said workpiece close obstruction 81. The said pivoting head portion 300 said wrench head wall width W comprises a said corrugated outer surface 309 opposite the curved interior corner profiles 310 in order to incorporate as low a profile said wrench head 200 as is prudent.

FIGS. 7, 8, 9, 10, 11 and 12 illustrate an even further embodiment of the said line wrench 1, whereas the pivoting head portion 300 is usefully operated by the depression of the thumb switch 307 or operated in the reverse or reposition R direction. The pivoting head portion 300 swivelling around the axis pin 50, compressing the resilient portion 60. Optionally the turning means 40 when operated in the reverse R direction causes the lobes or drive corners 72 of the engaged fastener 70 to act upon the fastener engagement faces 201, 301 against the bias of the resilient portion 60 to lever open the said pivoting head portion 300 enough to usefully allow the said wrench head portion 200 to relocate or reverse R in relation to the worked fastener 70 onto the next fastener engagement face 201, 301. In a further embodiment of the present invention 1 the said inner profile of the wrench head 204 at the curved internal corner profile 212, 310 nearest to the swivel joint portions 208, 308 has further scallops 213, 315. These said scallops 213, 315 generally fully align when the pivoting head portion 300 is fully open relative to the fixed head portion 202, in particular when the wrench head portion 200 requires to be repositioned or reversed R, relative to the operated fastener 70 within the wrench head inner profile 204, the fastener corners 72 requiring a passageway generally equivalent to the circumference diameter 73 of the said fastener corner points 72 as the said fastener corners 72 rotate within the confines of the wrench head inner profile 205, the said fastener corners 72 opening as required the pivoting head portion 300 against the resilient portion 60 during the reverse action R and in particular the fastener corner 72 adjacent the swivel joint portions 208, 308 incorporating the said scallops 213, 315 usefully allows the said fastener corner 72 to arc into the said scalloped recesses 213, 315 produced as the turning means 40 is operated in the reverse direction R, the pivoting head portion 300 thereby opening sufficiently to allow the passage of the abutting fastener corner 72 being repositioned.

Figure 10:
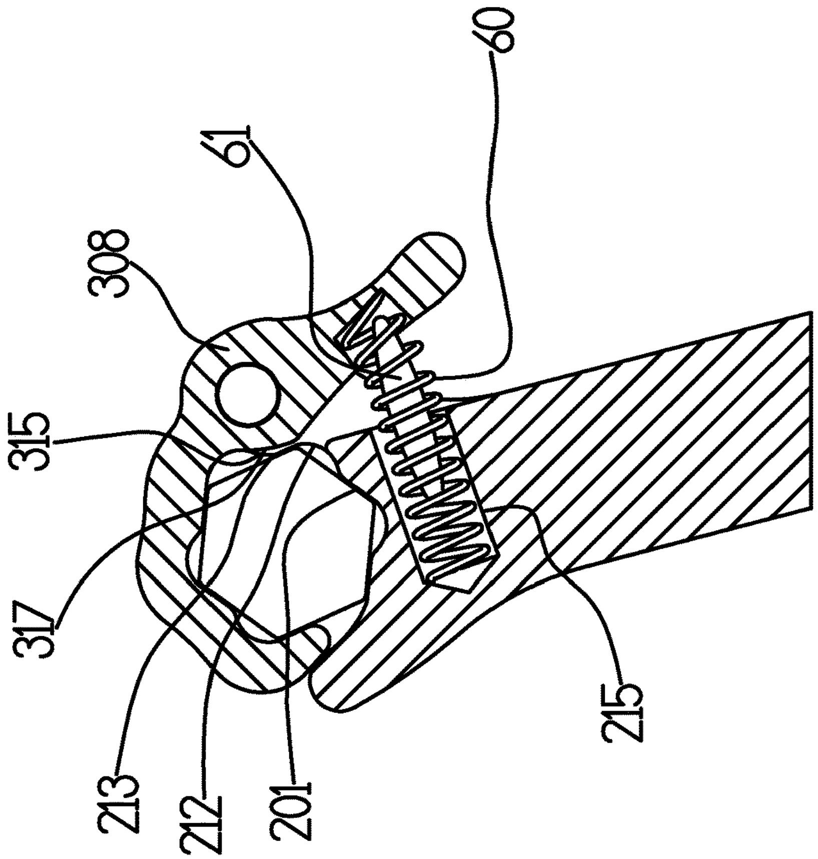
FIG. 10 is a sectioned plan view of the line wrench head pivoting and fixed head portions illustrating the location of the resilient portion and its internal anti kink device. The said pivoting head portion illustrated closed and the fastener engagement face lamination of the fixed head portion next to the swivel joint portions usefully operating upon the corresponding fastener drive face.

FIGS. 7, 8, 9, 10, 11 and 12 illustrate an even further embodiment of the said line wrench 1, whereas the swivel joint layers or laminations 214, 314 are orientated such that the outer joint laminations 214 are incorporated within the handle portion 40 and the inner swivel joint lamination 314 is incorporated within the pivoting head portion 300, this provides in use the best contact area between the operated fastener 70 and the fastener engagement faces 201, when the wrench head portion 200 is closed and the turning means 40 operated in the drive direction D as the profile of the said outer laminations 214 still incorporate sufficient fastener engagement faces 201 to allow the fastener 70 to be robustly operated, the inner said lamination 314 scallop 315 or as illustrated in FIG. 10 a reduced profile 317 within its said swivel joint portion 308 which in this iteration has little or no engagement face 201 acting upon the operated fastener drive face 71. The said outer laminates 214 scalloped profile 213, being situated at a point directly adjoining the fastener engagement faces 201 next to the swivel joint 208.

FIGS. 6 and 8 even further show the said wrench 1, fastener engagement faces 201, 301 engaged upon the drive faces 71 of a said fastener 70 attached to a piece of equipment 80, the said head portion 200 with its corrugated outer profile 309 in conjunction with the curved inner working surface corners 310. Further illustrated the said pivoting head portion 300 free end 305 and end cam surface 306, the pivoting head portion wedge 306 acting upon the said fixed head portion 202 fixed cam face 210 closing the fastener engagement faces 201, 301 upon the fastener drive faces 71 the more torque is applied in the drive direction D to the turning means 40.

Figure 9:
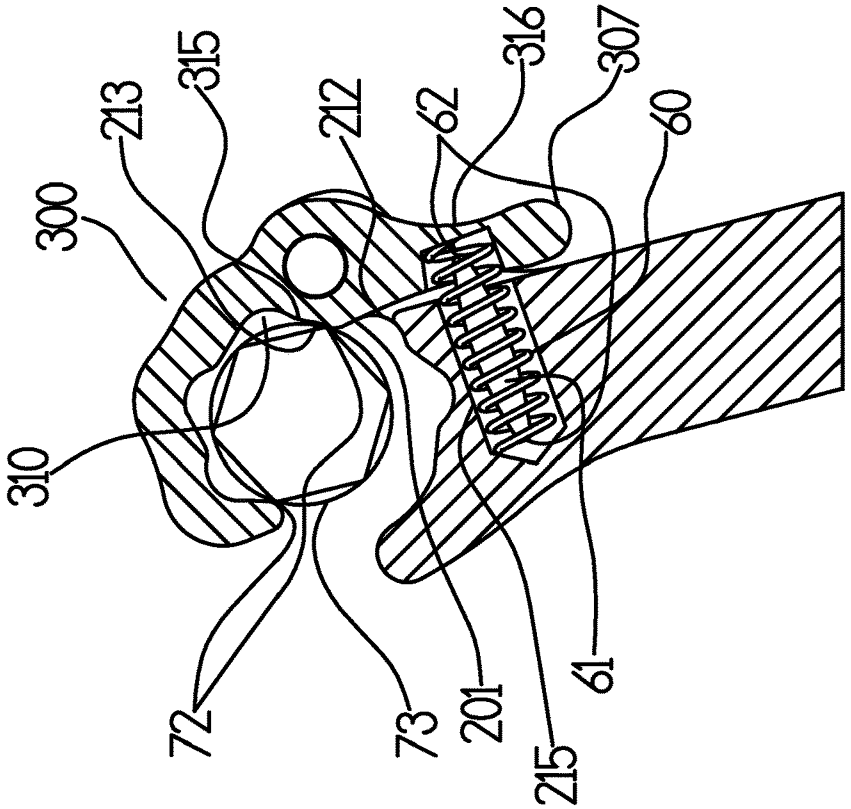
FIG. 9 is a sectioned plan view of the line wrench head pivoting and fixed head portions illustrating the location of the resilient portion and its internal anti kink device. The said pivoting head portion illustrated fully operated open. Further showing the generally aligned scallops allowing the reposition rotation of the fastener drive corners.
Figure 12:
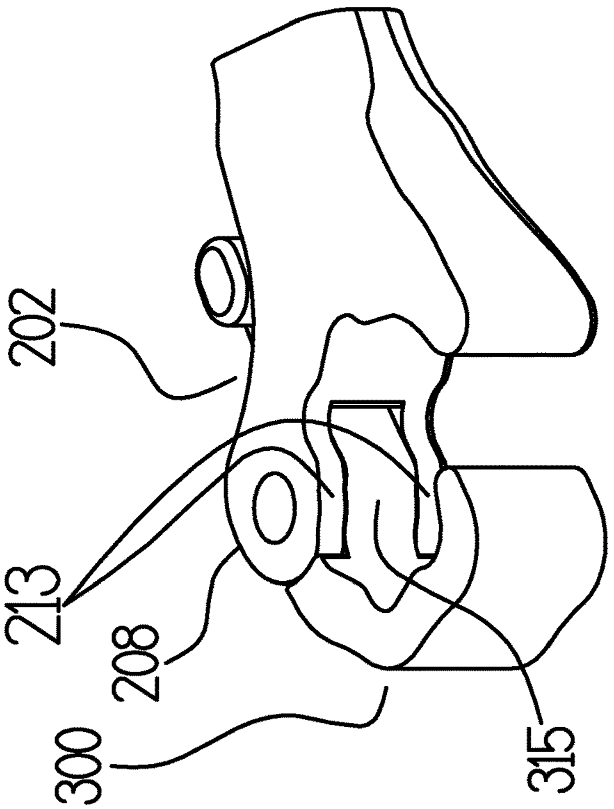
FIG. 12 is a perspective view of the line wrench head in the open position, illustrating in particular the fixed head portion scallops next to the swivel joint portions generally aligned with the pivotal ring scallop in order to usefully form a pathway for the corresponding fastener drive corner during the reverse or reposition sequence.
Figure 11:
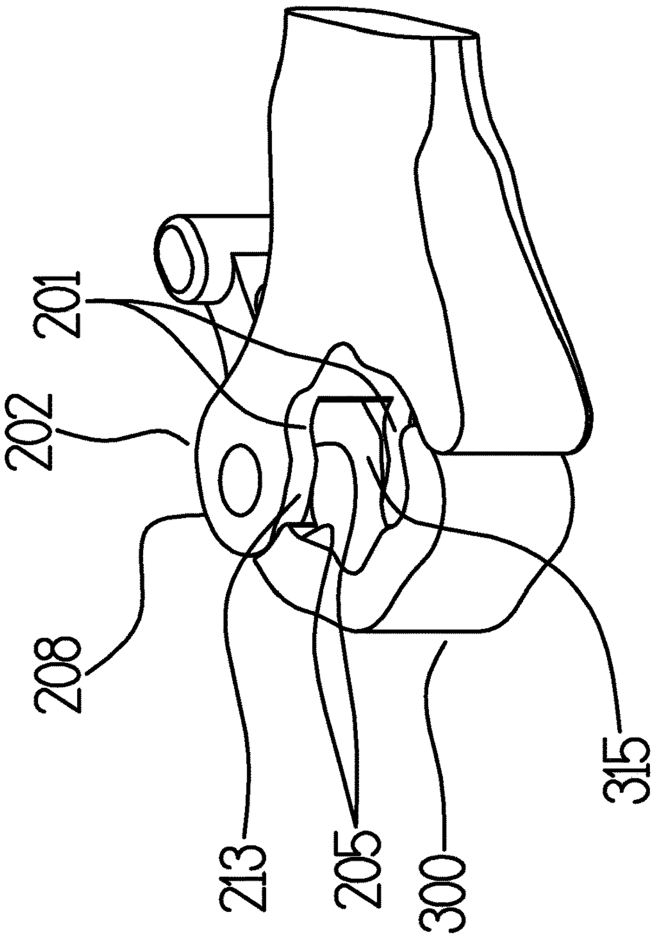
FIG. 11 is a perspective view of the line wrench head in the closed position, illustrating in particular the fixed head portion fastener engagement faces next to the swivel joint portion usefully forming part of the hexagonal internal profile.

FIGS. 9, 10 even further shows the said wrench head portion 200 in plan as in FIGS. 7, 8 but in section illustrating the said resilient portion 60 and its internal anti-kink device 61.

In an even further embodiment of the line wrench 1 the said resilient portion 60 is held in a non-kink operable position by a pliable piece of, in best practice plastic rod with rounded ends as an anti-kink device 61 within its confines. The length of the said non-kink device 61, being just less than that of the compressed length of the compression spring 60, around its circumference. As shown in FIG. 9 when the said spring 60 is compressed in the pivoting head portion 300 opening sequence, when the thumb switch 307 is operated, the further use of torpedo shaped rounded ends 62 preventing the coils of the compression spring 60 being caught on the said anti-kink device 61 ends as the said spring 60 and anti-kink device 61 are resiliently bowed during the said spring 60 compression throughout the pivoting head portion 300 opening sequence. As shown in FIG. 10 the use of the said anti-kink device 61, usefully further prevents the destructive bulging action prevalent in this type of bowed compression spring 60 usage depicted.

Figure 13:
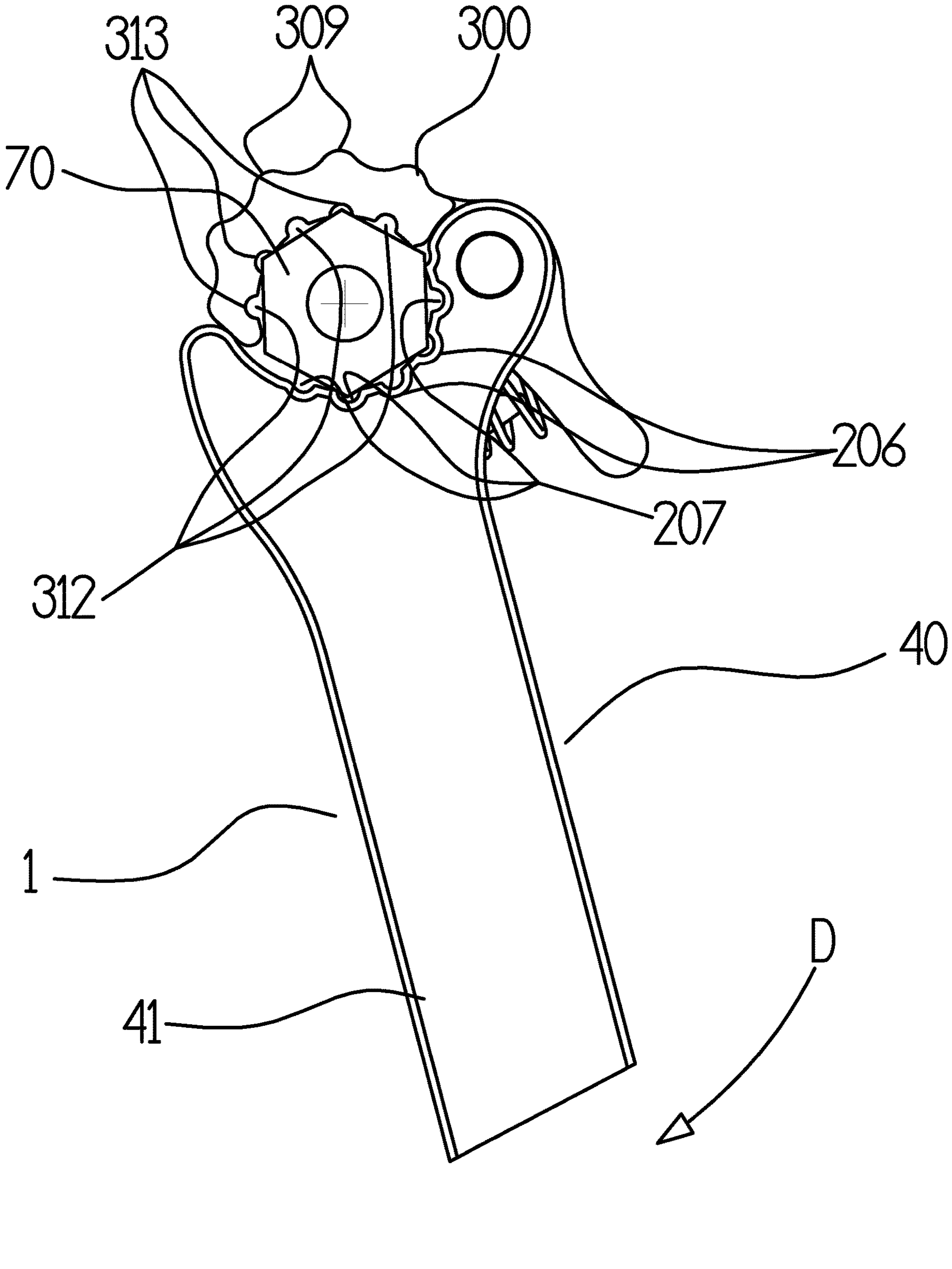
FIG. 13 is a top view of the line wrench head operated in the drive direction upon a correspondingly sized fastener, the said wrench head inner profile further illustrated with a 12-point castellated fastener drive.
Figure 14:
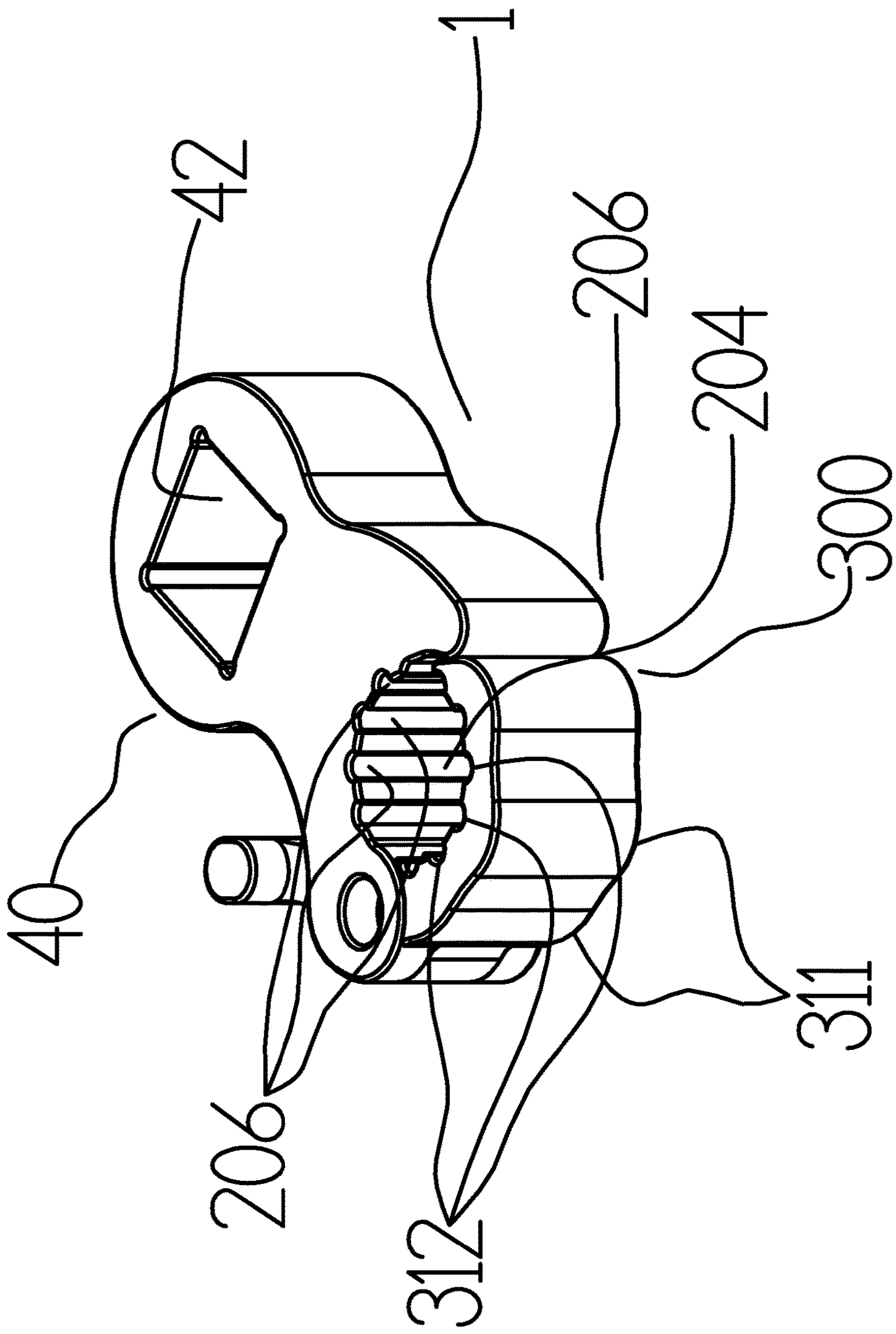
FIG. 14 is a perspective view of the line wrench head with a further square drive turning means, the said wrench head inner profile further illustrated with a 12-point castellated fastener drive.

FIGS. 13 and 14 illustrates an even further embodiment of a wrench head of the line wrench 1, the pivoting head portion 300 having a greater corrugated outer surface 309 on its the outer circumference. The wrench head inner profile 204 is further formed with U shaped corner profiles 207, 313 providing a 12 point castellated fastener drive 206, 312, which is corresponding correctly aligned with further 12 point drive outer corrugations 311, allowing the said pivoting head portion 300 when torque is applied in the drive direction D to the turning means 40, to resiliently flex at the said profiles 311, 313 of the 12 point fastener drive 312, usefully providing a reduced repositioning or reverse R arc (not shown) during use, 30 deg., instead of 60 deg. In FIG. 13 a fastener 70 is shown engaged by the 12-point castellated drive 206, 312, the turning means 40 depicted is a hand grip 41. FIG. 14 even further illustrates the wrench head with a drive receiving formation 40 in the form of a square drive aperture 42.

It will be understood that by housing the biasing member in the fixed head portion of the wrench head and the lever arm on the pivoting head portion, the height of the wrench head does not need to be increased as compared with a wrench head that has extension portions at the top of the wrench head to house a spring. Accordingly, the wrench head can be used on fasteners located relatively close to an obstruction.

It will be understood that the line wrench 1 while suited to use on flare nuts and the like may be used on fasteners more generally.

The invention claimed is:

1. A line wrench head comprising:

a fixed head portion comprising a first inner side comprising a plurality of fastener engaging surfaces;

a pivoting head portion comprising a second inner side comprising at least one fastener engaging surface;

a pivot member by which said pivoting head portion is pivotally connected to said fixed head portion, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space;

an elongate anti-kinking member; and a biasing member that biases said pivoting head portion to said closed position, wherein said pivoting head portion comprises a bore in which said pivot member is received and a lever arm extending away from said bore and is disposed alongside said fixed head portion such that movement of said lever arm towards said fixed head portion causes said pivoting head portion to move from said closed condition to said open condition, wherein said biasing member is a compression spring and said elongate anti-kinking member is disposed within said compression spring to at least reduce kinking of said compression spring, said elongate anti-kinking member having a first end, a second end disposed opposite said first end and respective taper portions that narrow towards said first and second ends, wherein said free end of said pivoting head portion has a tip and has a width that narrows towards said tip to define an outwardly facing ramp face, and wherein said first inner side comprises a camming surface engaged by said ramp face when the pivoting head portion is in said closed position and configured such that, in use, torque applied to said fixed head causes increased engagement between said ramp face and said camming surface to provide an increased grip on a fastener received in said fastener receiving space.

2. A line wrench head as claimed in claim 1, wherein said fixed head portion and lever arm comprise respective recesses in which opposite ends of said biasing member are housed.

3. A line wrench as claimed in claim 2, wherein said biasing member has a length and the recess in said fixed head portion has a length that is at least 60% of said length of the biasing member.

4. A line wrench head as claimed in claim 1, wherein said elongate anti-kinking member is made of a resilient plastics material.

5. A line wrench head as claimed in claim 1, wherein an outer side of said pivoting head portion is provided with recessing to facilitate flexing of said pivoting head portion.

6. A line wrench head as claimed in claim 1, wherein said fixed head portion comprises a formation to connect with a driver by which a torque is applied to said fixed head portion.

7. A line wrench comprising a line wrench head as claimed in claim 1, and a handle portion extending from said fixed head portion.

8. A line wrench head comprising:

a fixed head portion comprising a first inner side comprising a plurality of fastener engaging surfaces;

a pivoting head portion comprising a second inner side comprising at least one fastener engaging surface;

a pivot member by which said pivoting head portion is pivotally connected to said fixed head portion;

a hollow biasing member; and an elongate anti-kinking member disposed within in said hollow biasing member, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space, wherein said pivoting head portion has a free end that defines an outwardly facing ramp face and said first inner side comprises a camming surface engaged by said ramp face when the pivoting head portion is in said closed position and configured such that, in use, torque applied to said fixed head causes increased engagement between said ramp face and said camming surface to provide an increased grip on a fastener received in said fastener receiving space, wherein said biasing member biases said pivoting head portion to said closed position, and wherein said anti-kinking member has a first end, a second end disposed opposite said first end and respective taper portions that narrow towards said first and second ends.

9. A line wrench head as claimed in claim 8, wherein said anti-kinking member is made of a resilient plastics material.

10. A line wrench as claimed in claim 8, wherein said pivoting head portion comprises a bore in which said pivot member is received and a lever arm extending away from said bore and disposed alongside said fixed head portion such that movement of said lever arm towards said fixed head portion causes said pivoting head portion to move from said closed condition to said open condition.

11. A line wrench head as claimed in claim 10, wherein said fixed head portion and lever arm comprise respective recesses in which opposite ends of said biasing member are housed.

12. A line wrench as claimed in claim 11, wherein said biasing member has a length and the recess in said fixed head portion has a length that is at least 60% of said length of the biasing member.

13. A line wrench head comprising:

a fixed head portion comprising a first inner side comprising a plurality of fastener engaging surfaces;

a pivoting head portion comprising a second inner side comprising at least one fastener engaging surface;

a biasing member having a first end and a second end;

an elongate anti-kinking member having a first end and a second end; and a pivot member by which said pivoting head portion is pivotally connected to said fixed head portion, wherein said pivoting head portion is pivotable between a closed condition in which said first and second inner sides define a circumferentially closed fastener receiving space and an open condition in which a free end of said pivoting head portion is spaced from said fixed head portion to provide a side opening to said fastener receiving space, said biasing member providing a biasing force that biases said pivoting head portion to said closed condition, wherein said pivoting head portion has a free end that defines an outwardly facing ramp face and said first inner side comprises a camming surface engaged by said ramp face when the pivoting head portion is in said closed position, said ramp face and said camming surface configured such that, in use, torque applied to said fixed head causes increased engagement between said ramp face and said camming surface so that said free end of said pivoting head portion pressed inwardly with respect to said fastener receiving space and against a fastener received in said fastener receiving space to provide increased grip on said fastener, wherein said pivoting head portion comprises a bore in which said pivot member is received and a lever arm extending away from said bore and disposed alongside said fixed head portion such that movement of said lever arm towards said fixed head portion causes said pivoting head portion to move from said closed condition to said open condition, wherein said elongate anti-kinking member is disposed within said biasing member, and wherein said fixed head portion and lever arm comprises a first recess in which said first ends of said biasing member and said elongate anti-king member are received and a second recess in which said second ends of said biasing member and elongate anti-kinking member are received.

14. A line wrench as claimed in claim 13, wherein said biasing member has a length and the recess in said fixed head portion has a length that is at least 60% of said length of the biasing member.

* * * * *